Patented June 7, 1932

1,861,926

UNITED STATES PATENT OFFICE

LEOPOLD LASKA AND ARTHUR ZITSCHER, OF OFFENBACH-ON-THE-MAIN, GERMANY, ASSIGNORS TO GENERAL ANILINE WORKS, INC., OF NEW YORK, N. Y., A CORPORATION OF DELAWARE

NEW WATER INSOLUBLE AZODYESTUFFS

No Drawing. Application filed August 27, 1929, Serial No. 388,850, and in Germany September 8, 1928.

The present invention relates to new water-insoluble azodyestuffs corresponding probably to the general formula:

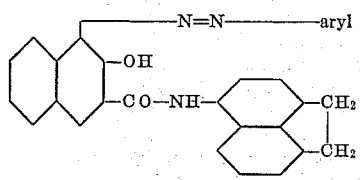

wherein aryl means the residue of an aromatic diazo-, tetrazo- or diazo-azo-compound not containing a solubilizing group such as a sulfonic or carboxylic acid group. The new azodyestuffs are obtained by combining either in substance or on the fiber an aromatic diazo-, tetrazo- or diazo-azo-compound of the aforesaid kind with 2' 3'-hydroxynaphthoyl-4-amino-acenaphthene.

Compared with the dyestuffs derived from 2' 3'-hydroxynaphthoyl-1-naphthylamine the present dyestuffs are distinguished by an extraordinarily dark shade of the lakes, dyeings and printings obtainable therewith. Even when using the diazo-compounds of relatively simple bases for the combination, dark garnet and claret-red shades are obtained, which are of a special value for many kinds of application. Furthermore some dyestuffs of the present series yield dyeings of a good fastness to kier boiling.

In order to further illustrate our invention the following examples are given, the parts being by weight and all temperatures in centigrade degrees. But we wish it to be understood that we are not limited to the particular conditions or specific products mentioned therein.

Example

Well boiled and dried cotton yarn is impregnated with a solution of 5.5 grs. of 2' 3'-hydroxynaphthoyl-4-amino-acenaphthene, 13 ccm. of a caustic soda solution of 34° Bé., 10 ccm. of Turkey red oil in the liter, well wrung out and developed in a diazosolution neutralized with sodium acetate and containing per liter 1.4 grs. of 2-nitro-aniline, rinsed and soaped.

A brown garnet-like dyeing of a good fastness is obtained.

The dyestuff thus produced on the fiber corresponds probably to the formula:

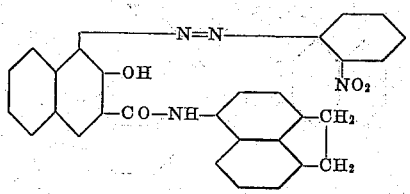

When using in the same manner the diazo compound of:   the following shades are obtained:
2.5-dichloro-aniline   orange-brown
2.4-dichloro-aniline   full claret
3-nitro-1.4-toluidine   dark claret
5-nitro-2-toluidine   bluish garnet
4-nitro-2-anisidine   claret
3-nitro-1.4-anisidine   dark violet-red
1-amino-anthraquinone   brownish garnet
dianisidine (subsequently treated with copper)   dark blue
o-amino-azotoluene   dark bluish violet-red
5-chloro-2-toluidine   full bluish red Since an object of the present invention is to provide dyestuffs of good fastness properties, which dyestuffs are insoluble in water and alkalies, it is to be understood that the aromatic nuclei of the general formulæ appearing in the appended claims contain no substituents which are known to render organic compounds soluble in water or alkalies and to tend to depreciate the fastness of the dyestuffs to alkalies. Substituents of this kind are the sulfonic acid, the carboxylic acid and the hydroxy group.

We claim:

1. As new compounds water-insoluble azodyestuffs corresponding probably to the general formula:

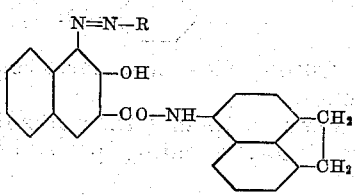

wherein R means a radical of the benzene (including azobenzene), naphthalene or anthracene series, which dyestuffs are distinguished by the dark garnet- to claret-red shade of the color lakes, dyeings and printings obtainable therewith.

2. As new compounds water-insoluble azo-dyestuffs corresponding probably to the general formula:

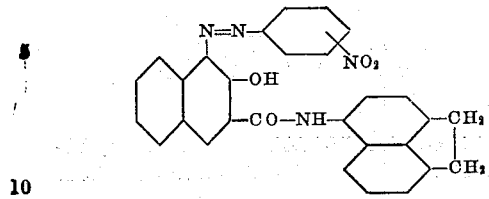

wherein the benzene nucleus may contain an alkyl or alkoxy group which dyestuffs are distinguished by the dark garnet- to claret-red shades of the color lakes, dyeings and printings obtainable therewith.

3. As new compounds water-insoluble azo-dyestuffs corresponding probably to the general formula:

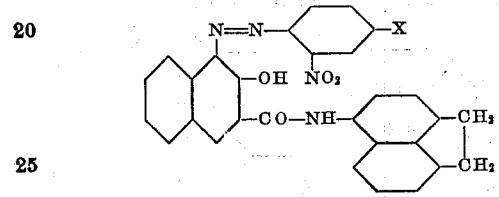

wherein X means hydrogen, methyl or methoxy, which dyestuffs are distinguished by the dark garnet- to claret-red shades of the color lakes, dyeings and printings obtainable therewith.

4. As a new compound the water insoluble azodyestuff corresponding probably to the formula:

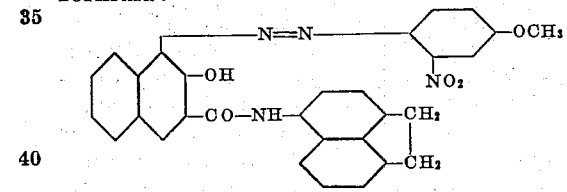

which dyestuff yields dark violet-red color lakes and dyeings.

5. As a new compound, the water-insoluble azodyestuff corresponding probably to the formula:

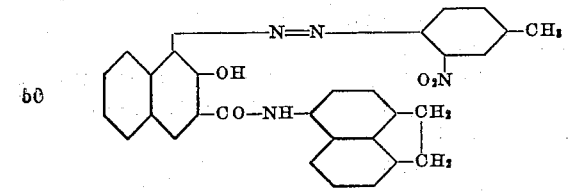

which dyestuff yields dark claret color lakes and dyeings.

6. As a new compound, the water-insoluble azodyestuff corresponding probably to the formula:

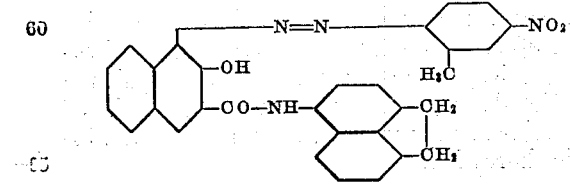

which dyestuff yields bluish garnet color lakes and dyeings.

In testimony whereof, we affix our signatures.

LEOPOLD LASKA.
ARTHUR ZITSCHER.